July 1, 1924.  
A. G. G. GUENTHER  
BOX STRAPPING MACHINE  
Filed Jan. 7, 1918  
1,499,454  
7 Sheets-Sheet 3
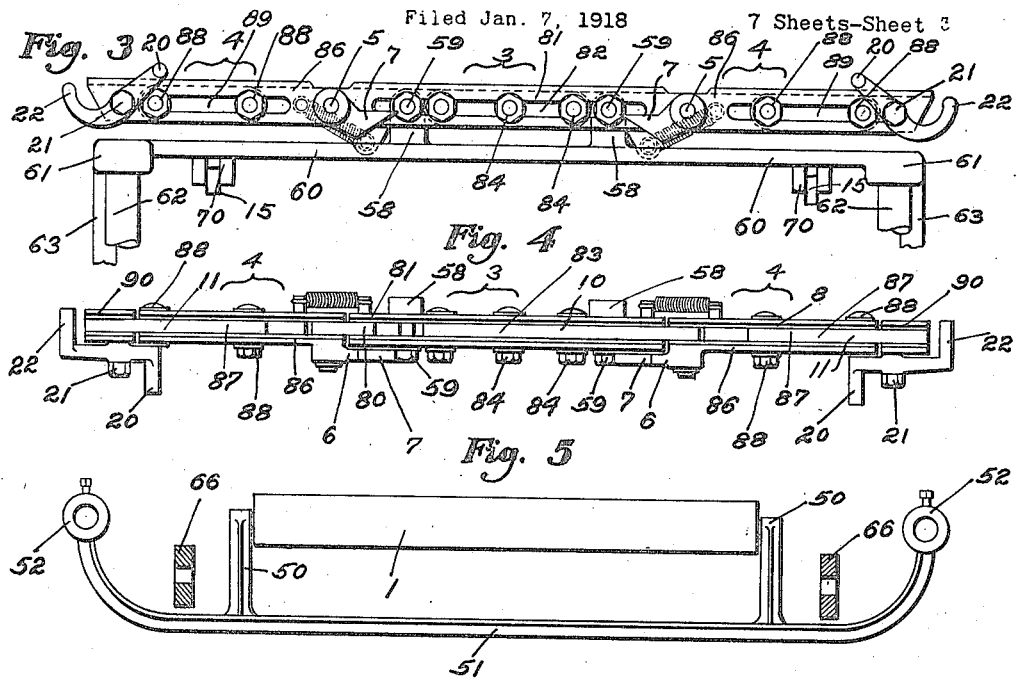
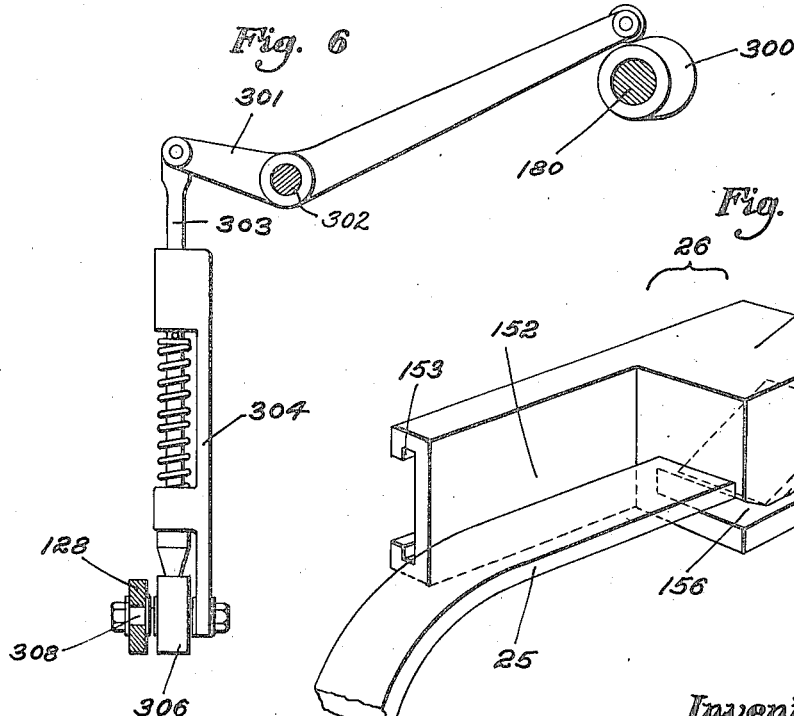
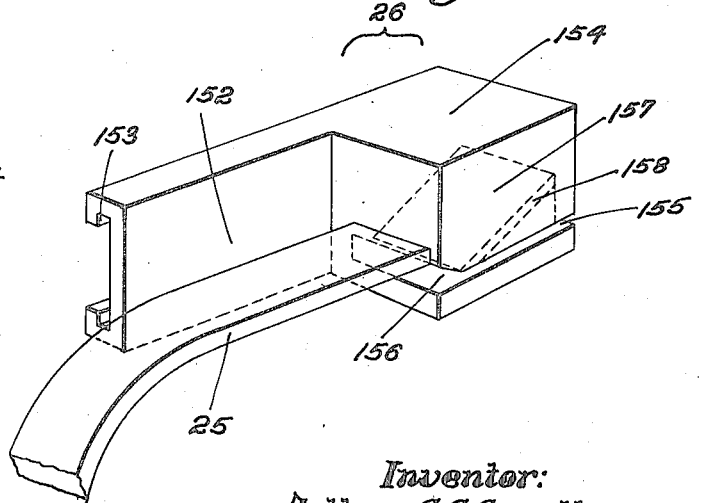
Inventor:
Arthur G. G. Guenther
By Emery Booth Janney & Varney
Atty's.

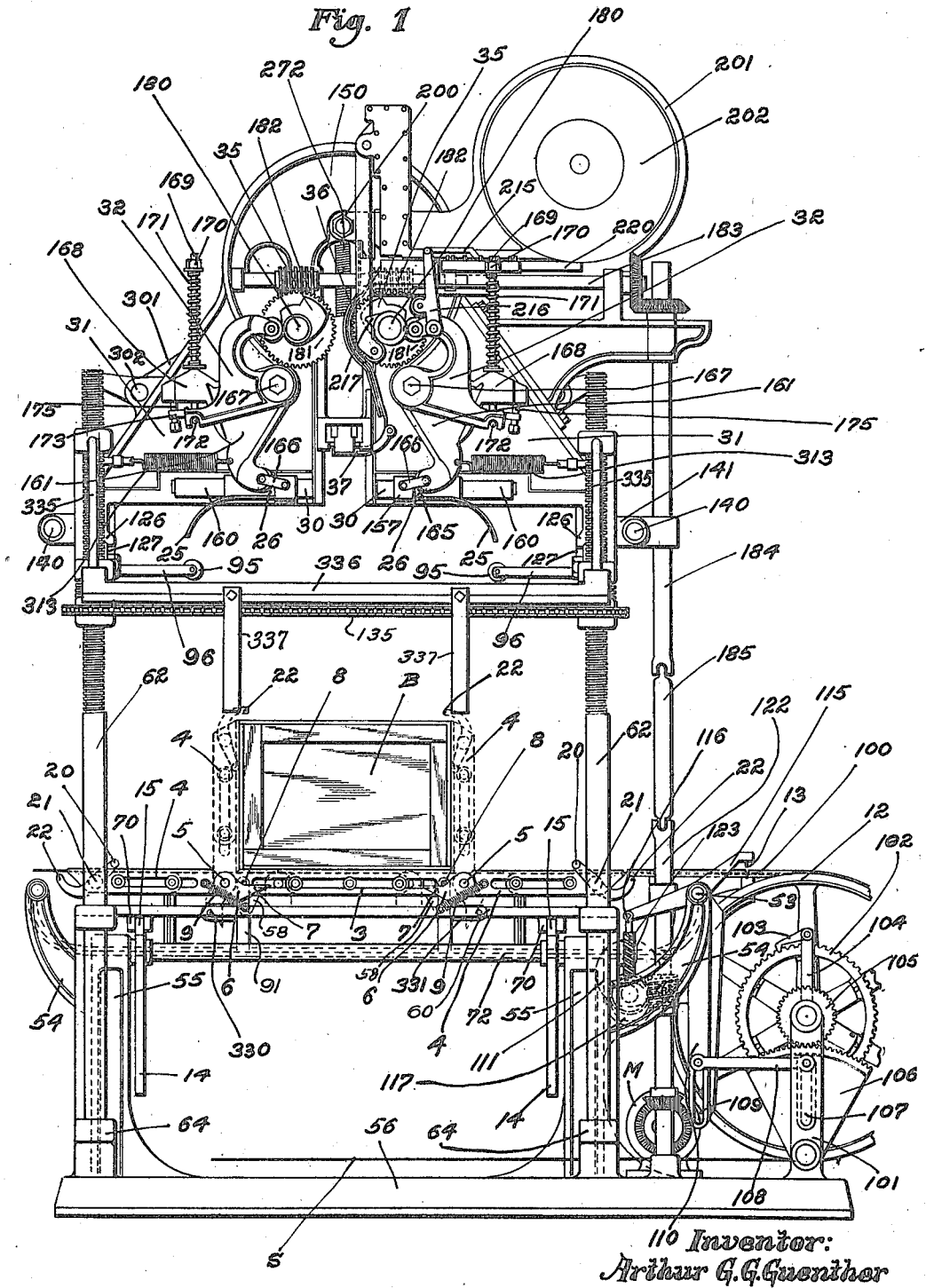

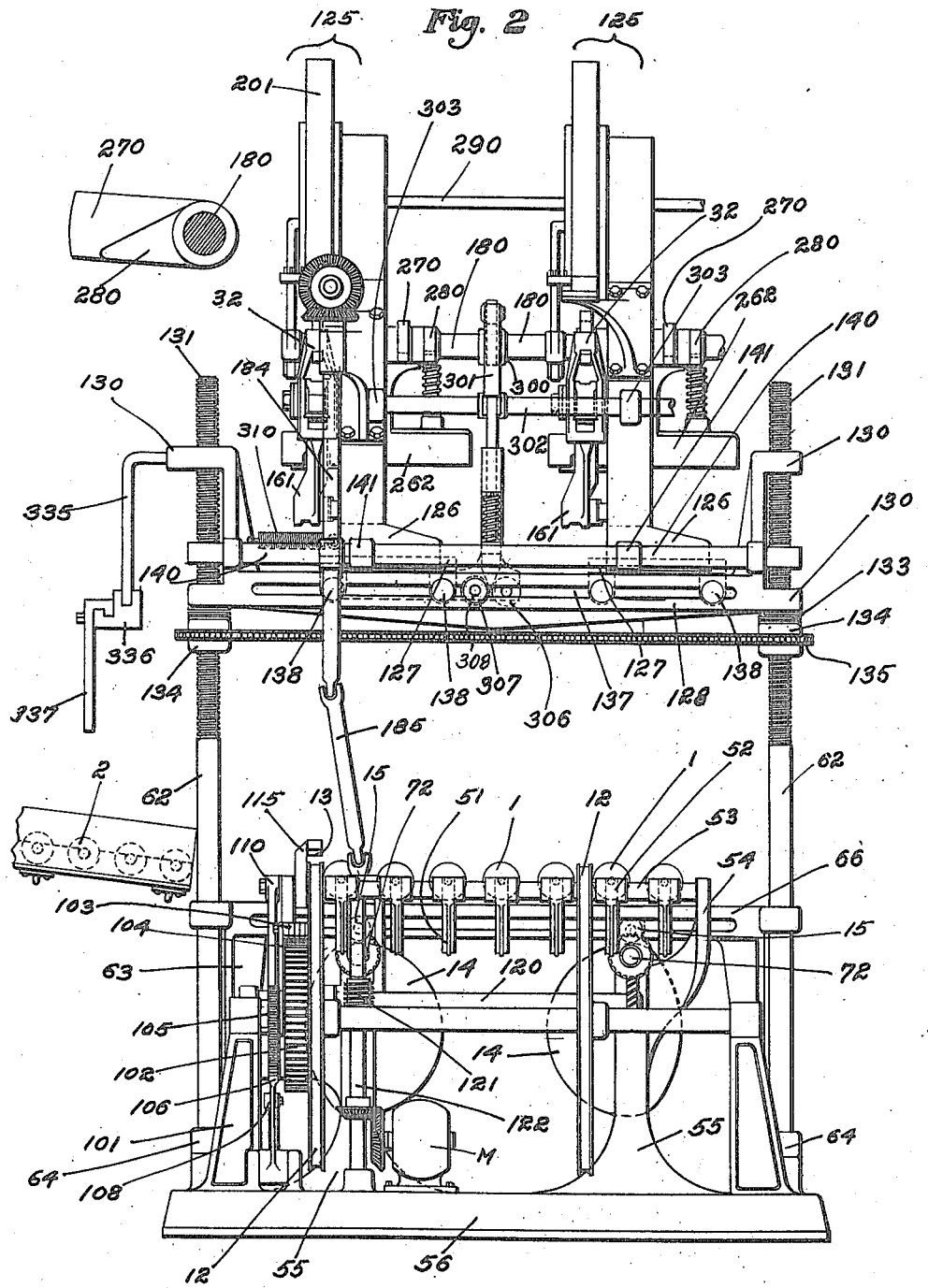

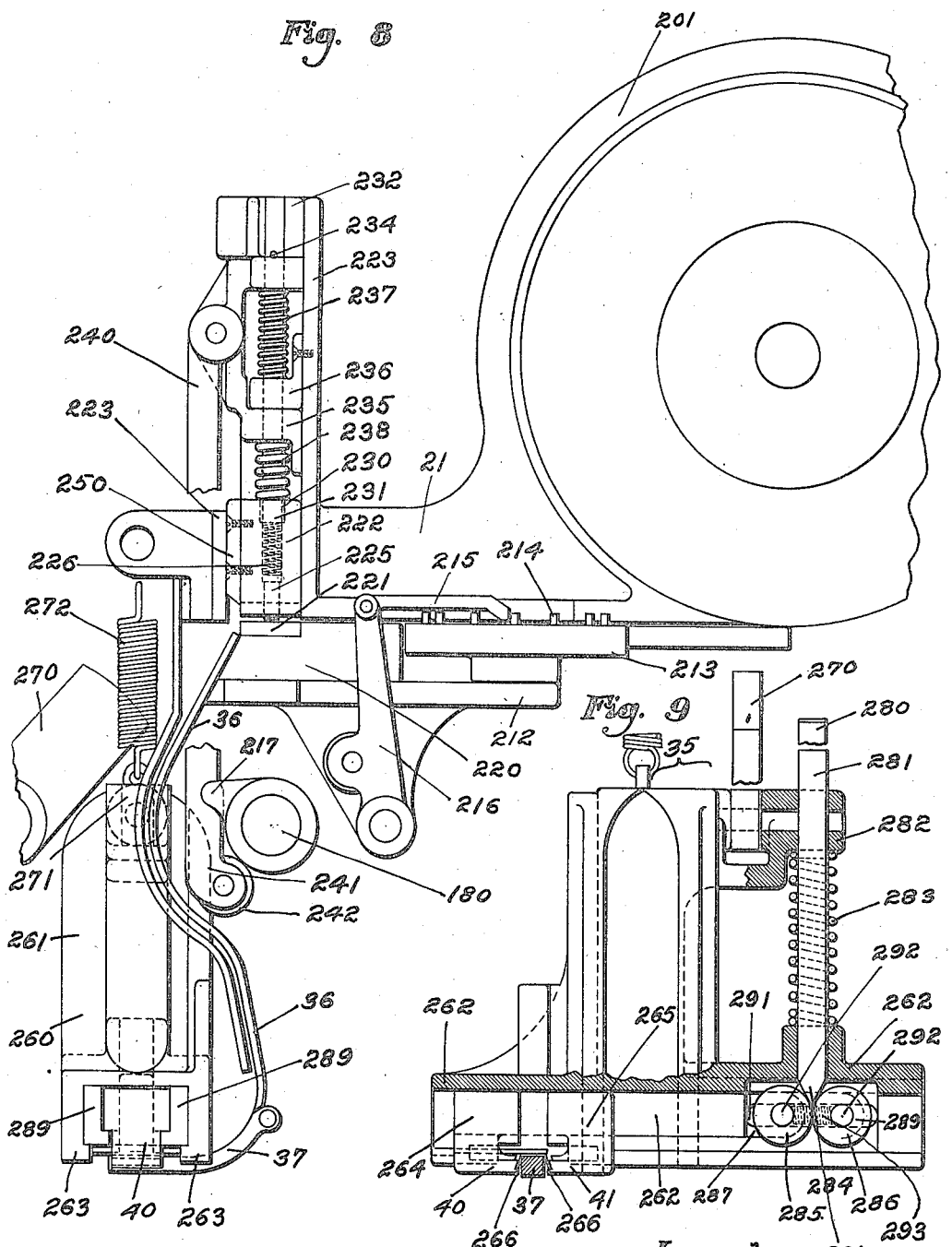

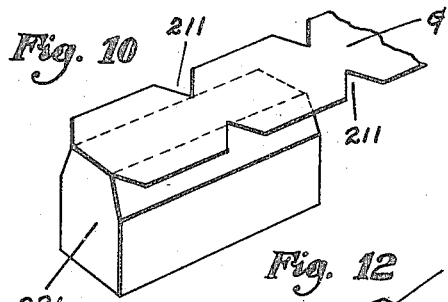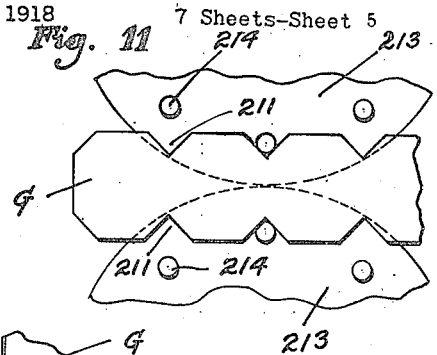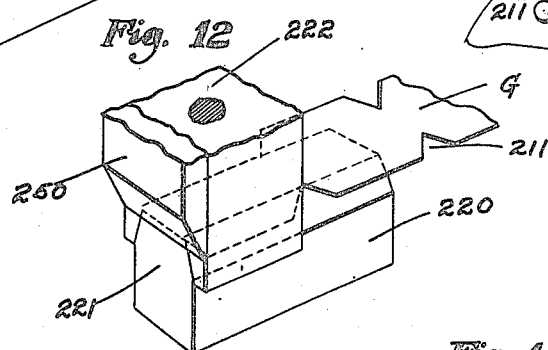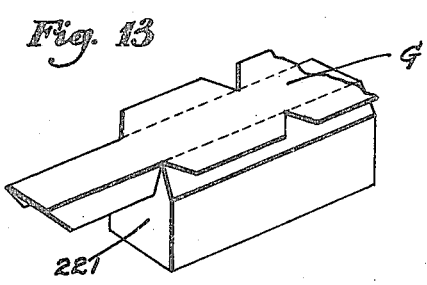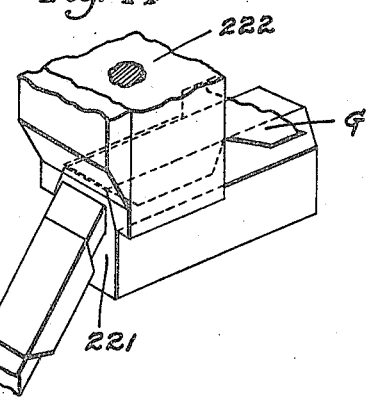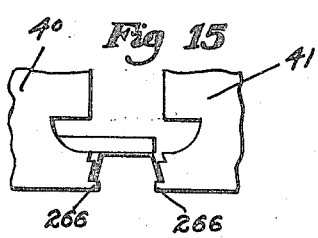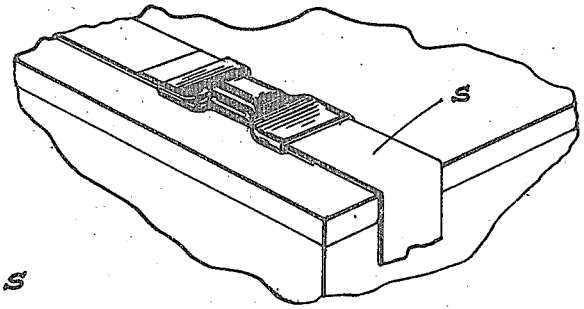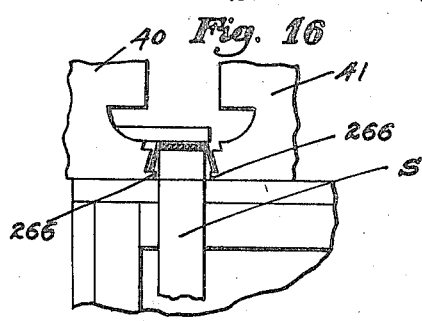

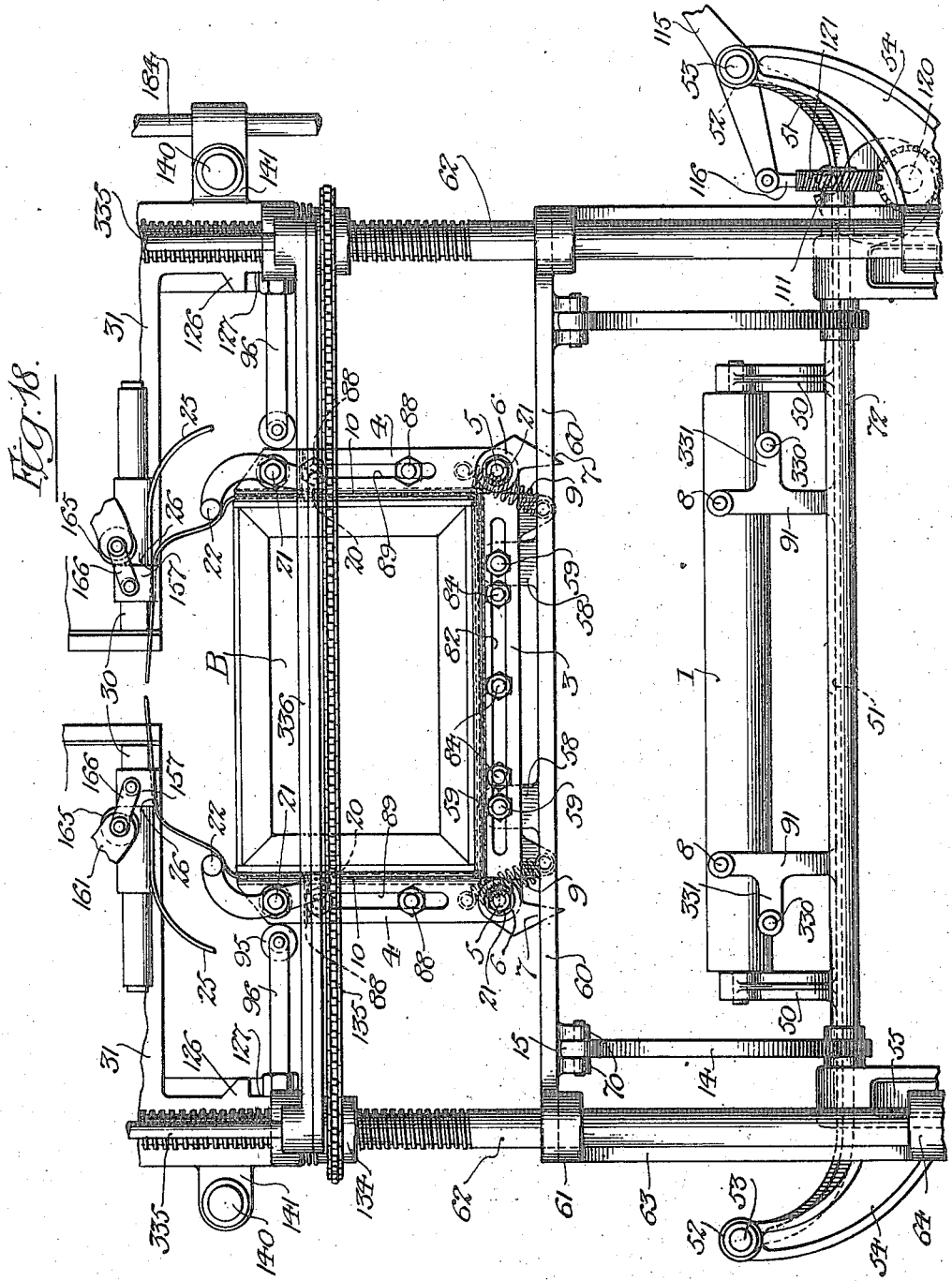

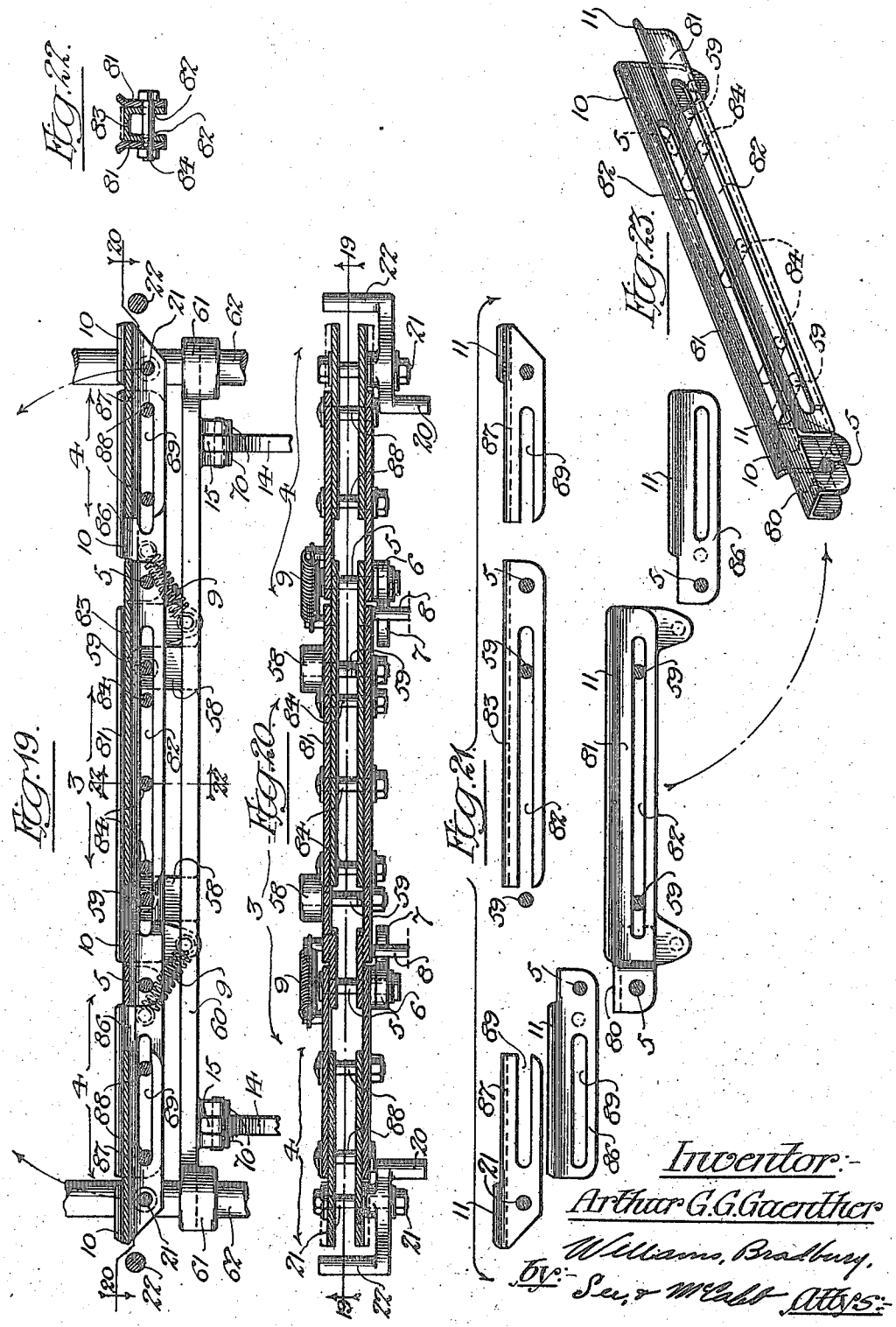

Patented July 1, 1924.

1,499,454

UNITED STATES PATENT OFFICE.

ARTHUR G. G. GUENTHER, OF CHICAGO, ILLINOIS, ASSIGNOR TO SIGNODE SYSTEM, INC., OF CHICAGO, ILLINOIS, A CORPORATION OF DELAWARE.

BOX-STRAPPING MACHINE.

Application filed January 7, 1918. Serial No. 210,616.

*To all whom it may concern:*

Be it known that I, ARTHUR G. G. GUENTHER, a citizen of the United States, residing at Chicago, in the county of Cook and State of Illinois, have invented an Improvement in Box-Strapping Machines, of which the following is a specification.

This invention relates to machines for supplying boxes or packages with tensional box strapping and joining the ends of the strapping. The object of the invention is to provide a machine of the character described of simple and economical construction and efficient operation.

Other objects and advantages of the invention will appear as the description to follow proceeds.

In the drawings:—

Fig. 1 is an end elevation of a machine constructed in accordance with my invention;

Fig. 2 is a side elevation thereof;

Fig. 3 is an elevation of a foldable guide forming a part of the invention;

Fig. 4 is a plan view of the guide;

Fig. 5 is an elevation showing the method of supporting the rolls upon which the box or package rests;

Fig. 6 is a detailed enlarged elevation of the shifting mechanism forming a part of the machine;

Fig. 7 is a perspective view of one of the grippers for gripping the ends of the box strapping;

Fig. 8 is an enlarged elevation of the girth forming means and the feed therefrom;

Fig. 9 is an elevation partly in section showing the crimping mechanism;

Figs. 10 to 16 are fragmentary views showing in succession the steps in the operation of the formation, feeding, and final crimping of the girth forming means upon the strap;

Fig. 17 is a perspective view of a portion of a box supplied with a box binder having its ends joined by the machine of my invention.

Figure 18 is an enlarged detail view in end elevation, showing the parts in elevated position, and a box in the process of being strapped.

Figure 19 is an enlarged view in longitudinal section of a box guide taken on line 19—19 of Figure 20.

Figure 20 is an enlarged top plan view of a box guide.

Figure 21 is a view of a box guide dissembled.

Figure 22 is a cross-sectional view taken on line 22—22 of Figure 19, and

Figure 23 is a perspective view of a member of a box guide showing the structure thereof.

The machine in general comprises a support upon which a box or package is placed and strap supplying mechanism which operates to feed a binder of an appropriate length under the box upon the support, and to fold up the strap against the sides of the box. The box is subsequently raised, the ends of the strap are seized by clamping jaws, and stretched into overlapping relation, and finally a reinforcing girth is applied to the overlapped ends of the strip and the girth and the strap are crimped together into a tension resisting reinforced joint, after which the box is discharged. The machine is adapted to accommodate as many strapping heads as desired so as to supply a box with as many binders as may be needed to adequately bind it.

In the drawings, two strapping heads only are shown, the particular machine being selected for illustration being adapted to supply a box with two binders.

In the description to follow, and to facilitate a ready understanding of the machine, the essential operations are first briefly explained, after which the detail description of the mechanism is given.

In the drawings, (Fig. 1) B represents a box in position to be operated upon by the machine. The box is trundled onto a platform in the machine comprising the rolls 1, from a roller chute 2, either by hand or by gravity, and comes to rest in the position indicated in Fig. 1. Slightly below the upper surface of the rolls 1 and movable past them, are a plurality of strap guides, each comprising a central guide member 3 and wing guide members 4, these members being each adjustable in length, as will be subsequently described. The box is placed above the central guide member 3. The guide members 4 are each pivoted to the central guide member 3 at the point 5 and each provided with projecting lug 6 secured to the guide members 4. The lug 6 has an extension 7 which projects under the stationary pin 8 mounted in the framework of the machine. Springs 9 serve to keep the wing members 4 in alignment with the central member 3 when the platform is at its lowermost position. The guides 3—4 are provided with aligned channels 10—11 in their top surfaces. When the parts are in the position shown in Fig. 1, a length of box strapping is fed along the guides 3—4 by the feed wheel 12 and is cut off by means of the knife 13, the machine being provided with adjustments (to be described) so that the length of strapping so provided will be sufficient to form the binder for the box. Subsequently, the entire platform upon which the guides 3—4 are mounted is raised by means of the cams 14 operating upon the friction rollers 15 upon the lower bed plate member 60 of the platform. As the platform carrying a box moves upwardly, the projections 7 engaging with the pins 8 which are stationary and serve to swing the guides 4 on the pins 5 and thus fold the wing guide members 4 into the position shown in dotted lines in Fig. 1 and thereby to fold the strap about the corners of the box and lay it up against the vertical sides of the box. Shortly prior to the time the wing guide members 4 come up against the vertical sides of the box, projecting arms 20 at the ends thereof strike the sides of the box. These arms are pivoted adjacent the ends of the guide members 4, as at 21, and provided with fingers 22, which are normally behind or underneath the strap, as clearly shown in Fig. 1. When the ends 20 of the arms, however, strike the sides of the box, these fingers will be rocked forwardly to bend the strap over the top corners of the box. The ends of the straps, being thus bent inwardly, will ride into the channel guides 25, and their ends will be fed through the clamping jaws 26 slidably mounted on the guide rails 30. By this time, the box will have finished its rising movement and have come up against the bottom of the strapping heads to be more fully described in detail. Subsequently, the rocking arms 32 which bear upon the clamping jaws 26 at their lower ends through a yielding spring connection are moved toward each other by the operating cams 35 to stretch the strap tightly about the box. Meanwhile, a reinforcing girth has been in the process of formation in the girth forming mechanism forming a part of this machine, the steps in the formation of the reinforcing girth being clearly illustrated in Figs. 10 to 14, where it is seen that the girth in the form shown in Fig. 14 slides down a guideway 36 off the guideway 37 pivoted thereto, and comes to rest astraddle the overlapped ends of the strapping, as clearly shown in Fig. 16. Subsequently, the crimping jaws 40 and 41 are moved toward each other to crimp the overlapped ends of the strap and the reinforcing girth into the tension resisting joint shown in perspective in Fig. 17. After this, the strapped box is lowered and trundled out of the machine, a new box taking its place. This particular description of the essential operating parts of the machine will serve to indicate the detail description to follow and make clear the operation of the various parts.

The rolls 1 which form a stationary receiving support for the box at the bottom of the machine, are mounted at their ends in uprights 50 (Fig. 5) forming a part of the casting 51 extending entirely across the machine and having enlarged bosses 52 at each end through which pass the shafts 53 (Fig. 2). The shafts 53 at their ends are supported in the curved brackets 54 integral with the uprights 55 extending upwardly from the base plate 56 of the machine. By this construction, it will be apparent that the rolls 1 form a stationary receiving support upon which the box may be trundled as it enters the machine to be operated upon.

The strap-guides 3—4 (Figs. 2, 3, and 4), whose function has been described, are carried by lugs 58, each connected by bolts 59 with the central guide member 3, the lugs 58 being formed integrally with the cross rod 60 provided with integral extensions having collars 61, which slide upon the four vertical posts 62 of the machine. For strength and stability, the collars 61 are provided with integral downward extensions 63 terminating in lower collars 64 also slidable upon the corner posts 62.

The rods 60 lie underneath a space between two adjacent rolls 1 and move up freely between them. To reinforce the construction and render it stable, longitudinal plates 66 are provided transversely of the rolls. These longitudinal plates 66 are integral with the rods 60, which occupy the space between the bosses 52 and the uprights 50, as clearly shown in Fig. 5. This construction results in a strong skeleton platform which moves freely from a position below to a position above the stationary rolls 1 and which carries the guides 3—4, which when in lowered position are just underneath the tops of the rolls 1 to permit the box to be trundled above them into the machine. The rods 60 are provided with lugs 70 containing the cam rollers 15 previously described engaged with the cams 14 upon the shafts 72 journalled in the uprights 55 heretofore described. By this construction, it is apparent that upon the revolution of the shaft 72 the cams 14 will serve to raise the entire skeleton platform and therefore the guides 3—4.

The function of the guides 3—4 has previously been described. I will now describe in detail their construction. The guide 3 is made up as follows:—One part of the guide comprises the bottom plate 80, Figure 21, connected to which are the flared guide members 81, slotted as indicated at 82. The second part of the member 3 is made up of the bottom plate 83. The members 80 and 83 both project beyond the flanges 81 at each end to afford a bearing for the guide members 4. The bottom member 83 is firmly secured between the flanges 81 by the bolts 84. By this means, the guide member 3 can be adjusted at will to suit various sizes of boxes. Upon the bolts 5 previously described, carried in the ends of the bottom members 81 and 83 are pivoted the side flanges 86 of the guides 4, one of these side flanges being provided with the integral lug 6 having the extension 7 previously described. Between the side flanges 86 of the guide members 4 is the bottom plate 87 secured therein by bolts 88 in slots 89 in the side flanges 86. The bottom plate 87 extends beyond the guide flanges 86 and is provided with supplementary guide flanges 90 and with the arm 22 previously described. It is apparent therefore that the members 3 and 4 can be adjusted in length to suit the width and height of various boxes.

The pins 8 previously described which operate the arm 7 to fold up the guide members 3 and 4 when the skeleton platform is raised, are carried on uprights 91 mounted on the casting 51 previously described. This mechanism operates as follows:—

When the cams 14 raise the skeleton platform, the box will be carried upwardly upon the guides 3 and 4, and as the platform moves upwardly the pins 8 will fold guides 4 up against the vertical sides of the box. In this folding motion, the springs 9 will pass centers and hold the guides 4 against the side of the box until the rollers 95 on adjustable rods 96 are reached, these rollers 95 serving to hold the guide firmly in position during the remainder of the operations. As soon as the guides 4 approach the sides of the box, the upper ends of the strap will be folded over the top corners of the box by the fingers 22.

I will now describe means for feeding the strap into the guides 3—4 and for cutting it off.

The strap S is led from any suitable source of supply about the friction faced strap feeding wheel 12, passing about it and leaving it through the guide 100. The feed wheel 12 is journalled in the upright standard 101 upon the bed plate 56 and is provided with a ratchet 102 with which is engaged the pawls 103 on the crank 104 secured to the seat 105 coaxial with the wheel 12. The gear 105 is operated by the segment 106 which is slotted as indicated at 107 to adjustably receive the link 108 connected at its other end in a slot 109 in the rocking arm 110 pivotally mounted upon the shaft 53. The arm 110 is operated by a cam 111. It is apparent that this mechanism can be set to feed any desired length of strap so as to provide binders suitable to different sized boxes. The cut-off blade 13 operates through a recess in the guide 100 and is mounted on an arm 115 pivoted on the shaft 53 and operated by a link 116 from the eccentric 117. The cam 111 and eccentric 117 are mounted in the shaft 120, which is driven by the worm 121 on the shaft 122 engaged by the motor M (Fig. 2) and the shaft 120 drives the shaft 72 by a spiral gear meshing with the spiral gear 123 on the shaft 72.

It will be readily understood that the guides 3—4, feed wheel and other connections, are duplicated for each binder which it is desired to put about the box. Thus, the shaft 120 is shown in Fig. 2 to drive shafts 72 for two sets of cams 14 and likewise two feed wheels and associated mechanisms.

I will now describe the mechanism for stretching the binder about the box and applying the joint in the overlapped ends of the binder. This mechanism comprises what may be termed strapping heads, one for each binder, any number of which may be employed in the machine according as to the number of binders it is desired to apply to the box. The strapping heads are indicated in general by reference character 125. They are each slidably mounted by means of shoes 126 on guide rails 127 securely bolted to the top frame structure 128 which comprises a vertically adjustable platform. The platform 128 is provided with spaced collars 130 freely slidable on the threaded upper portions 131 of the four corner posts 62. Underneath the lower collar 130 upon each corner post is a thrust bearing 133 which rests upon the threaded collar 134, this construction being duplicated at each corner post. The endless chain 135 is engaged with the four collars 134 and by this means the entire upper section of the machine may readily be adjusted up and down to take boxes of different sizes. In order to locate the binders at a desired location with respect to the boxes, the side members of the platform 128 are slotted as indicated at 137 and the shoes 127 are adjustably secured therein by bolts 138. By this means, the strapping heads may be set at different distances apart and in different locations. For the purposes of stability, outrigger shafts 140 are provided upon which are fixed collars 141 secured to the framework of the strapping heads, the shafts 140 being slidable in the enlarged ends of the platform 128. This tends to steady the construction throughout, and causes all the strapping heads to move in unison.

The strapping heads in general comprise an inverted V-shaped casting 150 having an enlarged apex as shown, this construction being slidable back and forth upon the guides 127 by means of the shoes 126 as previously explained and being steadied by being engaged with the guide rods 140 by means of the collars 141.

I will first describe in detail the stretching mechanism associated with each strapping head. It will be remembered that as the box is raised, the ends of the strap are bent over the top corners of the box by the fingers 22 and fed into the guides 25 passing into the clamping jaws. The clamping block 26 comprises an extended shoe 152 having a channel 153, and having an enlarged portion 154 in which is a slot 155 having a flared entrance 156. Mounted in the block 154 is a wedge 157 having a fin 158 which slides in a suitable interior groove in the block 154, the construction being such that the wedge 157 offers no resistance to the endwise movement of the strap into the slot 155 from the flared end but tightens on the strap and clamps it as the block is moved to the right (Fig. 7). It will be apparent, then, that these clamping jaws received the strap as soon as the box reaches its uppermost position, in which its upper surface is substantially in contact with the lower surface of the framework 150 of the strapping head. The clamping blocks 26 are mounted upon suitable guide rails 160 secured upon the casting 150, and the arms 161 bear upon the rear faces of the blocks 154 by means of friction rollers 165, link connections 166 causing the clamping blocks to move backward with the arms 161. The arms 161 are pivoted upon the bolts 167 and are provided at their rear sides with bosses 168 through which project upwardly and loosely the bolts 169 equipped with nuts 170 between which and the tops of the bosses 168 are interposed the strong springs 171. The bolts 169 are continued through the bosses 168 and provided with hooks 172 with which are engaged slots in the ends 173 of arms 32 previously described which also pivot on the bolts 167. Adjustable contacts 175 are provided to cause the return of the arms 161.

Two shafts 180 are provided each of which extends through and forms a part of the working mechanism of any number of separate strapping heads, as can be clearly appreciated from Fig. 2. Upon these shafts are rigidly mounted the cams 35 previously described, which operate the arms 32, and through them the clamping blocks. The shafts 180 are driven through the intermediary of gears 181 by means of worms 182 on the shaft 183 mounted in the top of the casting 150, the shaft 183 being in turn driven by means of bevel gears from the shaft 184 which is connected by universal joint link 185 with the vertical shaft 122 previously described. It will be apparent while the shafts 180 serve to operate any number of strapping heads there is only one drive for these shafts, as just described, i. e., one of the strapping heads only is supplied with driving mechanism for the shafts 180, the remainder of the strapping heads omitting this mechanism.

From the construction so far described, it will be understood that the strap ends being fed into the clamping jaws, the latter are moved toward each other by the cams 35, the limit of strain put on the strap, however, being controlled by the adjustment and strength of the springs 171. Upon inspection of Fig. 1, it will be observed that an elongated vertical arch is provided in the center of the casting 150 and that it will be across the mouth of this arch that the overlapped ends of the stretched straps will be laid.

The crimping jaws come down this elongated arch to straddle the strap and crimp it, but, first, however, a reinforcing girth is partially formed and placed upon the strap so as to form an element of the completed joint. Bearing this in mind, attention is next directed to the means for forming the reinforcing girth. Mounted upon the upper part of each of the castings 150, as by means of bolts, one of which, 200, is shown, is a casting 201 which carries, in a circular inset formed therein, a reel 202 adapted to contain a coil of girth forming material in the form of a strip of indefinite length and having the configuration shown, for instance, in Fig. 10, wherein it is noted that the girth forming strip G is provided with paired notches 211. Mounted upon a horizontal flange 212 (Fig. 8) forming a part of the casting 201, are the two pin wheels 213 carrying vertical pins 214 so spaced as to engage the notches 211 (see Fig. 11). One of these pin wheels is given an intermittent rotation by the feed pawl 215 carried by the arm 216 pivoted upon a depending lug from the flange 212 and operated from the small cam 217 on the right hand shaft 180 (Fig. 1). It will be noted at this point that the periphery of the casting 201 is extended to form a base plate 220, along which the strip feeds and which is cut away to accommodate the pin wheels 213. By this means, it is apparent that the strip G is fed forward the length of one girth for each cycle of the machine. By substituting different sized pin wheels, different sized reinforcing girths can be made, as will be immediately apparent. Formed integrally with the casting 201 and affording a continuation of the lower feed plate 220 is a forming die 221 shown in Fig.

12, and cooperating with this is a corresponding die 222 sliding in vertical guides 223 forming a part of the casting 201. The die 222 is made interchangeable and is provided with a contact pin 225 extended below the face of the die 222 by the light spring 226, the function of the contact pin 225 being to hold the strip in place for the forming operation. The forming die 222 is provided with a threaded recess in its top face 230 into which is secured the shaft 231, slidably mounted in the collar 232 slidable in the standard 223, and a pin 234 is provided to hold the collar 232 on the shaft 231. Slidable upon the shaft 231 is the collar 235, spaced from but integral with the collar 232, also running in vertical guideways in the standard 223.

Between the collars 232 and 235, is the fixed collar 236, secured to the standard 223. Between the collar 232 and the fixed collar 236, is the light recovery spring 237, and below the collar 235 is the heavy compression spring 238 through which the pressure of the upper die on the lower is effected. The upper spring 237 functions to return the die after the downward stroke thereof; the spring 238 cushions the pressure of the die. The die is operated by the link 240 connected to the collars 232 and 235 from the cam 217, the link 240 being curved at its lower end 241 and provided with the roller 242 for this purpose.

By this means, it will be apparent that the strip is given the formation shown in Fig. 13.

Simultaneously with this forming operation, the knife 250, fastened on the block 222, cuts the formed strip along the dotted line 251 shown in Fig. 13, and the partially formed girth slips down a raceway secured to the casting 201 and comprising a lower member 36 which the partially formed girth straddles and a cover plate 253, which keeps the girth on the plate 36. At the lower end of the member 36 is pivoted the guide 37 previously described, the partially formed girth coming to rest upon the guide 37.

Slidably mounted in the elongated vertical arch in the casting 150 is a casting, an end view of which is shown in Fig. 8, and in a cross sectional side view in Fig. 9. This casting extends transversely of the strapping head and comprises a vertical portion 261, which slides vertically in the strapping head, and a horizontal portion 262. In the horizontal portion 262, is provided the crimping mechanism. This horizontal portion 262 comprises two side flanges 263 projecting inwardly at their lower ends, one of the flanges 263 being partially cut away to accommodate the pivoted guide member 37, as clearly shown in Fig. 8. Within the flanges 263, are mounted the crimping members 264 and 265 each adapted to form the type of joint shown in Fig. 17 and each provided with crimping jaws 40 (previously referred to) and with slight under hung projections 266. In the normal position of the parts which is shown in Figs. 8 and 9, the partially formed girth G rides down the pivoted guide member 37, straddling the latter, and comes to rest with its flanges just clearing the projections 266, as clearly shown in Figs. 9 and 15.

With the parts in this position, the cam 270 upon one of the shafts 180 strikes a roller 271 in the vertical portion 261 of the crimper casting and causes this casting to move down the vertical arch against the tension of spring 272 and to assume the position shown in Fig. 16. In this operation, the guide 37 is swung back downwardly out of the way, the partially formed girth remaining supported upon the underhung projections 266 (see Fig. 9). The girth is thus carried down to the bottom of the arch in the casting 150 and assumes a position astride the overlapped strap ends which are raised somewhat from the box end by the clamping jaws 266, or into the position clearly shown in Fig. 16, while the jaws 40 and 41 assume positions one on each side of the strap.

Immediately after the parts have assumed this new position, a second cam 280 upon the same shaft 180 strikes the vertical pin 281 mounted in the same boss 282, which carries the roller 271 (Fig. 9), depressing this pin against the spring 283 and causing its pointed lower end 284 to wedge between and separate the rollers 285 and 286.

The roller 285 is connected to the link 287, which is connected to the crimper 265, carrying jaw 41, above described. The roller 286 is connected to the two links 289, each of which is slidable in the depending flanges 263 above described (see Fig. 8) and which are connected to the crimper 264, carrying jaw 40. These links 289 are provided with inwardly turned flanges, as clearly seen in Fig. 8, which form the seats in which the link 287 slides relatively to them. The side flanges 263 are slotted, as shown at 291, and the axles 292 of the two rollers 285 and 286 run in these slots. These axles are connected by springs 293. By this construction, it will be apparent that when the pin 281 is forced downwardly the jaw 40 (Fig. 9) will be moved to the right and the jaw 41 to the left, crimping the strap and the reinforcing girth, which has been placed in a position to form the joint shown in Fig. 17. After the cams 280 have operated, one to force the entire casting 35 down into cooperative relation with the strap, and the other to operate the crimping jaws, as just explained, the springs 272 and 283 occasion the recovery of the parts.

Remembering the operation so far described, it will be apparent that the joint has by this time been formed in the stretched and overlapping straps and the packaging operation is completed. It is now only necessary to disengage the straps from the clamping jaws in order to permit the box to be freely moved out of the machine. This result is accomplished in the following manner:—

All of the strapping heads are connected not only because they all carry the same operating shafts 180, but also by the rods 290 (Fig. 2) to which each strapping head is bolted in any suitable manner. Therefore the movement imparted to one of the strapping heads to cause it to move longitudinally of the machine or in the direction of the motion of the box will be communicated to all of the strapping heads, and they will all move alike. I therefore provide upon one of the shafts 180 a cam 300 (Figs. 2 and 6) which operates the bell crank lever 301 fast upon the shaft 302, which passes through collars 303 upon the strapping heads and to which the strapping heads are likewise adjustably bolted. The end of the bell crank 301 operates the vertical pin 303 slidably mounted in the vertical casting 304 secured to an extension 305 shown in dotted lines in Fig. 2 from the shoe 126 of the first strapping head 125. The extension 305 (Fig. 2) carries a roller 306, and a roller 307 is adjustably mounted in the slot 137 in the platform 128 adjacent the roller 306 by means of the bolt 308 Figure 6 and the spring 310 Figure 2 is secured at one side of the enlarged end of the platform 128 and at the other end to the shoe 126. By this means, it will be apparent that all of the strapping heads after the joint has been completed will be moved sharply a short distance to one side of the strap they have just stretched and joined.

Taking into effect now the configuration of the cams 35, it will be apparent that they comprise an extended section and a step-down portion 312. This is for the purpose of permitting the arms 161 which operate the clamping jaws to move back slightly as soon as the joint forming operation has been completed, the springs 313 effecting this result. It will be apparent therefore that the clamping jaws, after the joint has been completed, move back slightly and at the same time of course release the strap owing to the wedge construction thereof, clearly apparent from Fig. 7. At this juncture, the strapping heads are moved sideways by the mechanism just described, which carries the clamping blocks 26 sidewise off the strap, the strap coming out of the side of the slot 155 (see Fig. 7). Subsequently, the raising cams 14 lower the skeleton platform, which carries the guideways 3—4 upon which the box has been supported, and the box, now supplied with a number of tightly stretched and joined binders, descends until it comes to rest upon the stationary rolls 1. The wing guides 4 at about the time they are released by the rolls 95 are flipped back into their original horizontal position by reason of the fact that the inclined fear face of the projection 7 strikes the pins 330 carried on extensions 331 from the standards 91. This swings the wing guides 4 outwardly, causing the springs 9 to cross the pivotal center 5 and assume the position shown in Fig. 1, thus holding the wing guides down.

It will be apparent from the description that a box is trundled into the machine and during the strapping operation is raised so that it is supported on the bottom upon the guides 3, while the bottom of the castings 150 substantially touch it at the top. It is apparent, therefore, that the machine must be correctly adjusted to take boxes of different vertical dimensions. Otherwise the box would be crushed or some of the mechanism damaged in the event of a too high box being put into the machine. In order to prevent this contingency, I provide the outriggers 335 attached to the collars 130 on the entrance side of the machine. These outriggers carry the cross rod 336 upon which are adjustably mounted the stops 337. These stops extend below the lower surface of the castings 150 by an extent exactly equal to the distance the box is raised by the cams 14. Thus, any box which will pass under the stops 337 cannot be damaged or damage the machine, because its top cannot be raised further than the distance between the bottoms of the stops 337 and the bottoms of the castings 150, and this distance is exactly the distance the cams 14 will raise the box. The stops 337 are adjustable up and down with the platform and serve as automatic regulators. It is only necessary to operate the chain 135 so as to bring the stops 337 into position where they just graze the top of a box passing into the machine to effect automatically the adjustment of the machine to take a box of that vertical dimension and it is impossible to get into the machine a box large enough to be damaged by, or damage, the machine.

Having now described the machine of my invention, and although I have laid particular stress throughout upon the operation thereof so that it has been clearly outlined, I shall recapitulate the essential operations of the machine. A box to be strapped is trundled down along the rollers 2 passing from these rollers onto the stationary rollers 1 (Fig. 2). At the beginning of the operation, with the box in position as described, the guides 3—4 are aligned horizontally and are just underneath the top of the rollers 1. With the box in position, the strap feed mechanism first operates to pass in a series of binders appropriate to the box to be strapped and to cut off these binders, leaving them upon the aligned guides 3—4. After this operation, the raising cams raise the skeleton platforms which carry the guides 3—4 so that the central guides 3 come up between the rollers under the box, pick up the box, and proceed upwardly. At this time, the projections 7 on the wing guides 4 engage the pins 8 and are thus folded up to slap the strap ends up against the vertical sides of the box, the springs 9 in this operation crossing center and holding the strap in its new position. In the continued operation, the fingers 22 are operated because the lever arms on which they are mounted strike at the ends opposite from the fingers against the sides of the box and bend the strap over the top corners of the box. In other words, while the box is moving upwardly the strap has been laid by means of the guides 3—4 around three sides of the box, folded over the top corner of the box and projects inwardly. Simultaneously with the folding of the strap over the top corners of the box, the ends of the strap strike the guides 25, pass along these guides and into the clamping jaws 26 and the box comes up to substantial contact with the lower faces of the castings 150 of each strapping head. By means of the cams 35, the clamping jaws are next moved toward each other, pulling the strap taut about the box with a pressure determined by the strength and adjustment of the springs 171 to stretch the strap and present the overlap over the ends of the stretched strap across the bottom of the elongated arch in the castings 150 and slightly raised from the surface of the box. During the operations just described, the girth forming mechanism has operated to feed forward a length of girth forming material, partially form a girth, cut it off, discharge it in the position shown in Fig. 9, wherein the partially formed girth rests upon the pivoted guide 37 and its downturned flanges just above the projections 266 on the crimping jaws. Next, the crimper casting, carrying the partially formed girth, descends until the crimping jaws, with the girth between them, straddle the overlapped ends of the stretched strap, this operation being effected by the cam 270 striking the roller 271, as will be clear from Figs. 8 and 9. Immediately thereafter, the cam 280 strikes the pin 281, which forces the crimping jaws together, crimping the girth and the strap ends to form the joint clearly shown in Fig. 17. After this, all of the strapping heads move sidewise slightly by means of the pin 303, which forces apart the stationary roller 307 (Fig. 2) and the movable roller 306 connected to the shoe of the first strapping head so as to move the clamping jaws sidewise with respect to the strap to clear it, the clamping jaws having first been moved backwardly and thus partially released owing to the configurations of the cams 35. The skeleton platform carrying the guides 3 upon which the box is supported descends, lowering the strapped box, and as it reaches the lowermost position, the wing guides 4 are thrown back into their original position and the aligned guides 3—4 descend below the level of the stationary receiving rolls 1, leaving the box now strapped supported upon the latter. The box is immediately trundled out of the machine and a new box takes its place, being fed in there by gravity or by hand.

Having now described my invention, I claim:—

1. A machine for use in strapping boxes including in combination means for stretching a metallic strap or binder applied about a box or package with the ends of said strap in mutually overlapped relation and in alinement, and means for joining the said overlapped strap ends by forming simultaneously therein interlocking tension resisting deformations.

2. A machine for use in strapping boxes including in combination means for stretching a metallic strap or binder applied about a box or package with the ends of said strap in mutually overlapped relation and in alinement, and means for joining the said overlapped strap ends by forming simultaneously therein and in a reinforcing element interlocking tension resisting deformations.

3. A machine for use in strapping boxes including means to stretch a flat metallic tension resisting strap or binder, applied about the box or package, and to present the ends thereof under tension mutually overlapped and superposed one upon the other, and in combination therewith means for joining said overlapped ends by simultaneously crimping the same, said means being capable of crimping therewith an added reinforcing member, into conjoined interlocking tension resisting deformations.

4. In a machine of the character described, means for passing a binder, comprising a flat strip of tension resisting box strapping, about a box or package, means for stretching said binder and means for joining the ends of said binder together.

5. In a machine of the character described, means for passing a binder comprising a flat strip of tension resisting box strapping about a box or package, means for stretching said binder and means for joining the ends of said binder together, including means for applying a reinforcing girth about the joint in the binder.

6. In a machine of the character described, means for passing a binder, comprising a flat strip of tension resisting box strapping, about a box or package, separate means for stretching said binder adapted to cause its ends to overlap and means for simultaneously crimping said overlapped ends to produce a tension resisting joint.

7. In a machine of the character described, means for passing a binder comprising a flat strip of tension resisting box strapping, about a box or package, separate means for stretching said binder adapted to cause its ends to overlap and means for simultaneously crimping said overlapped ends to produce a tension resisting joint, said last named means including means to apply a stiff metal reinforcing girth upon and as an element of the joint.

8. In a machine of the character described, means for passing a binder, comprising a flat strip of tension resisting box strapping, about a box or package, stretching means for seizing the ends of said binder and drawing the same tight about the box or package in mutually overlapping relation and means for joining the said overlapped ends.

9. In a machine of the character described, means for passing a binder, comprising a flat strip of tension resisting box strapping, about a box or package, stretching means for seizing the ends of said binder and drawing the same tight about the box or package in mutually overlapping relation and means for joining the said overlapped ends, and means for disengaging the stretching means from the overlapped ends after the latter have been joined.

10. In apparatus of the class described, means to enwrap a box or package with a flat metal tension resisting binder under tension and to present the ends of the binder in overlapped relation, means to encircle said overlapped binder ends with a reinforcing girth and to thereafter simultaneously crimp said girth and the overlapped ends into interlocking tension resisting deformation.

11. In apparatus of the class described, means to enwrap a box or package with a flat metal tension resisting binder under tension and to present the ends of the binder in overlapped relation, means to encircle said overlapped binder ends with a reinforcing girth and to thereafter simultaneously crimp said girth and the overlapped ends into interlocking tension resisting deformation, and means to disengage said wrapping, and encircling and crimping means from the binder.

12. In apparatus of the class described, means to present overlapped and tensional binder ends upon a box or package in operative relation with girth forming means, means to partially form reinforcing girths, means to apply said girths upon said overlapped and tensional binder ends and means to simultaneously crimp the girths and binder ends into a tension resisting joint.

13. In apparatus of the class described, means to feed a strip of girth forming material, means to bend the edges of successive portions of said strip, means to sever said portions from the strip and means to transfer said severed portions to another point in the machine.

14. In apparatus of the class described, means to feed a strip of girth forming material, means to bend the edges of successive portions of said strip, means to sever said portions from the strip and means to transfer said severed portions to another point in the machine, including means to apply said severed portions to a pair of overlapped flat box strap ends.

15. In apparatus of the class described, means to feed a flat strip having aligned notches in its edges forward step by step, means to bend the edges of the successive portions of the strip between successive pairs of notches, means to sever said successive portions of the strip, and means to transfer said severed portions to another point in the machine.

16. In apparatus of the class described, a supply adapted to contain girth forming material comprising a flat metal strip, means to feed said girth forming material from said supply, means to partially form successive portions of said strip, means to sever said partially formed portions and means to transfer the same to another part of the machine.

17. In apparatus of the class described, a supply adapted to contain girth forming material comprising a flat strip having oppositely faced notches therein, intermittently operated means engaging with said notches to feed the strip forward one notch at a time, forming means to upset the edges of the successive portions of the strip between successive pairs of notches and means to sever the strip across the notches.

18. In apparatus of the class described, a container for a supply of girth forming material comprising a flat strip having oppositely faced notches therein, intermittently operated means engaging with said notches to feed the strip forward one notch at a time, forming means to upset the edges of the successive portions of the strip between successive pairs of notches and means to sever the strip across the notches, crimping means, and a guide to transfer the severed portions into co-operative relation with the crimping means.

19. In apparatus of the class described, a support for a box or package, a guide for flat binder straps located under the top face of the support, means to pass a flat tensional binder along said guide and under the box or package, means to fold said binder against the vertical sides of the box in order to surround three sides thereof.

20. In apparatus of the class described, a support for a box or package, a guide comprising a central portion adapted to underlie the box or package, and two movable portions communicating therewith, means to insert a tension resisting binder into said guides, means for folding said movable portions up against two sides of the box or package whereby the guide in its folded position will apply the binder to three sides of the box or package.

21. In apparatus of the class described, a support for a box or package, a guide comprising a central portion underlying the box or package and two movable portions communicating therewith, means to insert a tension resisting binder into said guides, means for folding said movable portions up against two sides of the box or package whereby the guide in its folded position will apply the binder to three sides of the box or package.

22. In apparatus of the class described, a support for a box or package, a guide member for flat metallic box strapping comprising a single portion adapted to underlie the box or package and two wing portions in communication with the central portion, said wing portions adapted to be moved with respect to the central portion, means for inserting a binder comprising a flat metallic tension resisting strip, in the guide member, means for folding the two wing portions against two sides of the box or package whereby the binder will be wrapped around three sides of the box or package, a pair of stretching jaws adapted to receive and grasp the ends of the binder presented by the wing members, means for moving said stretching jaws to tighten the binder about the box or package.

23. In apparatus of the class described, in combination, a support for a box or package to be supplied with a binder, and a binder applying element, comprising means to receive a binder and to apply a section thereof flatwise into substantial contact with a portion of the periphery of the box or package.

24. In apparatus of the class described, a support for a box or package, a device for receiving a binder, said device being adapted to fold about the box whereby the binder in said device will be brought flatwise into substantially contacting relation with a plurality of the sides of the box.

25. In apparatus of the class described, a wrapping receiving device comprising a foldable member adapted to receive a binder and to thereafter be folded to enwrap a plurality of the sides of the box or package and to bring the binder flatwise into contact with corresponding sides thereof whereby the binder will be partially wrapped about the box without substantial slack at the corners or elsewhere.

26. In apparatus of the class described, a foldable wrapping device having provision for receiving a binder, hinges in said foldable wrapping device to correspond to angles in the box or package to be encircled with the binder, whereby when the wrapping device is folded the binder therein will be bent at points corresponding to corners of the box or package and may be applied thereto without substantial slack at the corners.

27. In apparatus of the class described, a jointed binder receiving member adapted to be bent to correspond to the periphery of the box or package to be encircled with a binder, said binder receiving member being adapted to receive a binder and to apply it flatwise into substantially contacting relation with a portion of the periphery of the box or package.

28. The method of supplying a box or package with a binder which consists in providing a binder receiving member adapted to be bent into a form corresponding to the periphery of the box or package, inserting a binder into said member and folding the member about the box or the like to bring the binder flatwise into contact with the periphery thereof without substantial slack.

29. The method of supplying a box or package with a binder which consists in applying the binder to one face of the box or package, supporting the portion of the binder projecting beyond said face upon a supporting device, folding said supporting device up against another side of the box or package whereby the extending portion of the binder is brought substantially simultaneously flatwise into contact with said other side of the box or package.

30. The method of applying a binder to a box or package which consists in providing a foldable binder receiving member adapted to assume the periphery of a portion of the box or package; applying the binder to the binder receiving member, then folding the binder receiving member and binder therein about a portion of the box or package to apply the binder flatwise to each face of the box or package substantially simultaneously throughout the said face, bending the ends of the binder over the corners of the box or package not enwrapped by the binder receiving member, and pulling the ends of the binder toward each other to completely encircle the box or package and stretch the binder.

31. In apparatus of the class described, a support for a box or package, a guide member for flat metallic box strapping comprising a single portion adapted to underlie the box or package and two wing portions in communication with the central portion, said wing portions adapted to be moved with respect to the central portion, means for inserting a binder comprising a flat metallic tension resisting strip, in the guide member, means for folding the two wing portions against two sides of the box or package whereby the binder will be wrapped around three sides of the box or package, a pair of stretching jaws adapted to receive and grasp the ends of the binder presented by the wing members, means for moving said stretching jaws to tighten the binder about the box or package, and means for simultaneously crimping said stretched ends together to form a tension resisting joint.

32. In apparatus of the class described, a support for a box or package, a central guide member mounted upon said support and adapted to underlie a box or package upon said support, wing guide members associated with said central guide member and in open communication therewith, said central and wing members being adjustable to accommodate various sized boxes or packages, means for raising the support, and means for simultaneously swinging the wing guide members up against two sides of the box or package.

33. In apparatus of the class described, a support for a box or package, a guide member underlying said support, means for guiding in a flat metallic tension resisting strip into said guide member, and means for severing a length of said strip sufficiently to form a binder for the box or package, means for folding said guide member and the contained strip about three sides of the box or package, means for grasping the ends of the binder presented by said guide member after being folded and stretching the same in overlapped relation upon the box or package, means for partially forming a reinforcing girth and applying the same to overlapped ends, and means for thereafter simultaneously crimping the girth and overlapped ends to form tension resisting joint.

34. In apparatus of the class described, a support, means for partially enwrapping a box or package upon said support with a tension resisting flat metallic binder, means for completing the wrapping of the box or package with the binder located above the support, and means for raising the support and lowering the portion of the mechanisms above the support whereby the support on the one side and the said mechanisms on the other will contact with opposite sides of the box or package.

35. In apparatus of the class described, a support, means for conveying thereto and therefrom a box or package, means for partially enwrapping a box or package with a flat metallic tension resisting binder when supported upon said support, means for completing the wrapping and forming a joint in the overlapped ends of said binder upon another side of the box or package, and means for raising said support and lowering portions of said last named means to bring the same into cooperative relation with the top of the box or package.

36. In apparatus of the class described, a support adapted to receive a box or package to be wrapped, a plurality of strap feed devices adapted to feed and sever a length of strap to form binders about said box or package, wrapping devices for partially enwrapping said box or package with said binders while the same is supported upon the support, stretching and joining mechanism comprising means for seizing the ends of said binders, stretching the same in overlapped relation upon the top of the box or package, and means for simultaneously forming interlocking deformations in said overlapped ends to form tension resisting joints therein, and means for bringing the support and said stretching and joining means into cooperative relation with opposite sides of the box or package.

37. In apparatus of the class described, means for applying a tension resisting joint to overlapped metallic strap ends comprising in combination means for applying a reinforcing girth simultaneously to both overlapped ends and means to simultaneously crimp said girth and said ends with an interlocking tension-resisting deformation.

38. In apparatus of the class described, means for joining the ends of metallic tensional strapping, comprising in combination means for applying a partially formed reinforcing girth to partially encircle both the overlapped strapped ends and means for bending the girth to completely encircle said strap ends, whereby said strap ends may be joined and reinforced by a reinforcing girth while in mutually overlapped contact.

39. In apparatus of the class described, means for maintaining mutually overlapped strap ends comprising means to apply a portion of a partially formed girth to said strap ends and means to bend another portion of the girth around the strap ends whereby said strap ends may be simultaneously encircled with a reinforcing girth without disturbing their mutually overlapping contact.

40. In a machine for strapping boxes or the like, and in combination, means for applying a flat tension resisting metallic binder to the box or the like including stretching means to underlap an end of the binder under another portion thereof extending in the opposite direction whereby, adjacent an end of the binder, two portions thereof are mutually overlapped under tension and in alinement.

41. In a machine for strapping boxes or the like, and in combination, means for applying a flat tension resisting metallic binder to the box or the like, and stretching means adapted to present the opposite ends of a binder encircling the box or package, under tension in mutually overlapped relation, one end being superposed above the other end and in alinement therewith.

42. In a machine for strapping boxes, and in combination, means to sever off a flat binder of predetermined length from a continuous strip appropriate to the size of the box or the like to be strapped; means to apply said binder about the box or the like including means to present the ends of said binder under tension in mutually overlapped relation, one end being superposed upon the other and in alinement therewith.

43. In a machine for applying flat tensional strap to boxes or the like and in combination means to apply strapping to the box or the like, gripping means to grasp the strapping behind its ends, and adapted relatively to force one end of the strapping into under lapped relation under another portion thereof which extends in the opposite direction whereby said strap will be presented under tension and overlapped upon itself for joining at the overlapped portion.

44. In a machine for applying flat tensional strap to boxes or the like, and in combination, means to apply strapping to the box or the like, gripping means adapted to grasp the strapping behind its ends, and to force said ends, projecting from said gripping means mutually past each other in the line of the strap so as to provide superposed strap ends in alinement for a joint.

45. In apparatus of the class described, and in combination, means for maintaining the ends of a binder under tension about a box or package and automatic means for thereafter applying to said ends a joint forming element and thereafter forming a joint involving said ends and said element.

46. In apparatus of the class described, means for applying a flat metallic tensional binder about a box or package with the ends of the binder extending in opposite directions, and means for joining said ends together in a tension resisting joint.

47. In apparatus of the class described, means for applying a flat metallic tensional binder about a box or package with the ends of the binder extending in opposite directions, and means for thereafter stretching said binder to cause the same to encircle the box or package under heavy tension.

48. In apparatus of the class described, means for applying a flat metallic tensional binder about a box or package with the ends of the binder extending in opposite directions, and means for thereafter stretching said binder to cause the same to encircle the box or package under heavy tension, and means for forming a tension resisting joint in the opposed ends of the binder.

49. In a machine of the character described and in combination, means for passing a tensional metallic binder about a box or package, and gripping means adapted thereafter to grasp said binder adjacent an end thereof and draw the same taut upon the box or package.

50. In a machine of the character described, means for presenting a binder applied on a box or package, with its end portions extending in opposite directions, gripping means for thereafter seizing said binder adjacent said end portions and pulling the same taut about the box or package.

51. In apparatus of the class described and in combination means for applying a tension resisting binder about a box or package, and yielding means for stretching said binder.

52. In apparatus of the class described and in combination means for applying a tension resisting binder about a box or package, and yielding means for stretching said binder, said last named means including means for adjusting the tension of said yielding means.

53. In apparatus of the class described, and in combination, means for applying a metallic tension resisting binder about a box or package, means for thereafter gripping the end portions of said binder, tightening the same about the box or package under heavy tension, including cushioning means for regulating said tension.

54. In apparatus of the class described, and in combination, means for applying a metallic tension resisting binder about a box or package, means for thereafter gripping the end portions of said binder, tightening the same about the box or package under heavy tension, including adjustable cushioning means for regulating said tension.

55. In apparatus of the class described, means for applying a flat metallic tension resisting binder to boxes or packages, means for stretching said binder, including means for imparting thereto a predetermined tension.

56. In a machine of the class described, and in combination, means for applying a tensional binder to boxes and packages, a gripping element for seizing an end portion of said binder, means for moving the gripping element to tighten the binder, and a yielding connection between the gripping element and the moving means, whereby the binder is protected against overstrain.

57. In a machine of the character described, and in combination, means for applying a cut to length binder about a box or packages, means for thereafter stretching said binder about the box or package, including means whereby the tension of said binder about the box or package may be predetermined.

58. In apparatus of the class described, and in combination, means to maintain a tension resisting binder, under tension about a box or package, means to apply to the ends of said binder a joint element, and means to form a joint in said binder ends and the joint element.

59. In apparatus of the class described, and in combination, means to maintain a binder under tension about a box or package, with its ends overlapped, means to apply a reinforcing element to said overlapped ends, and means thereafter to form a joint in said ends and element.

In testimony whereof, I have signed my name to this specification.

ARTHUR G. G. GUENTHER.